No. 685,026. Patented Oct. 22, 1901.
J. H. BELL.
CONVEYER.
(Application filed Mar. 13, 1900. Renewed May 15, 1901.)
(No Model.)
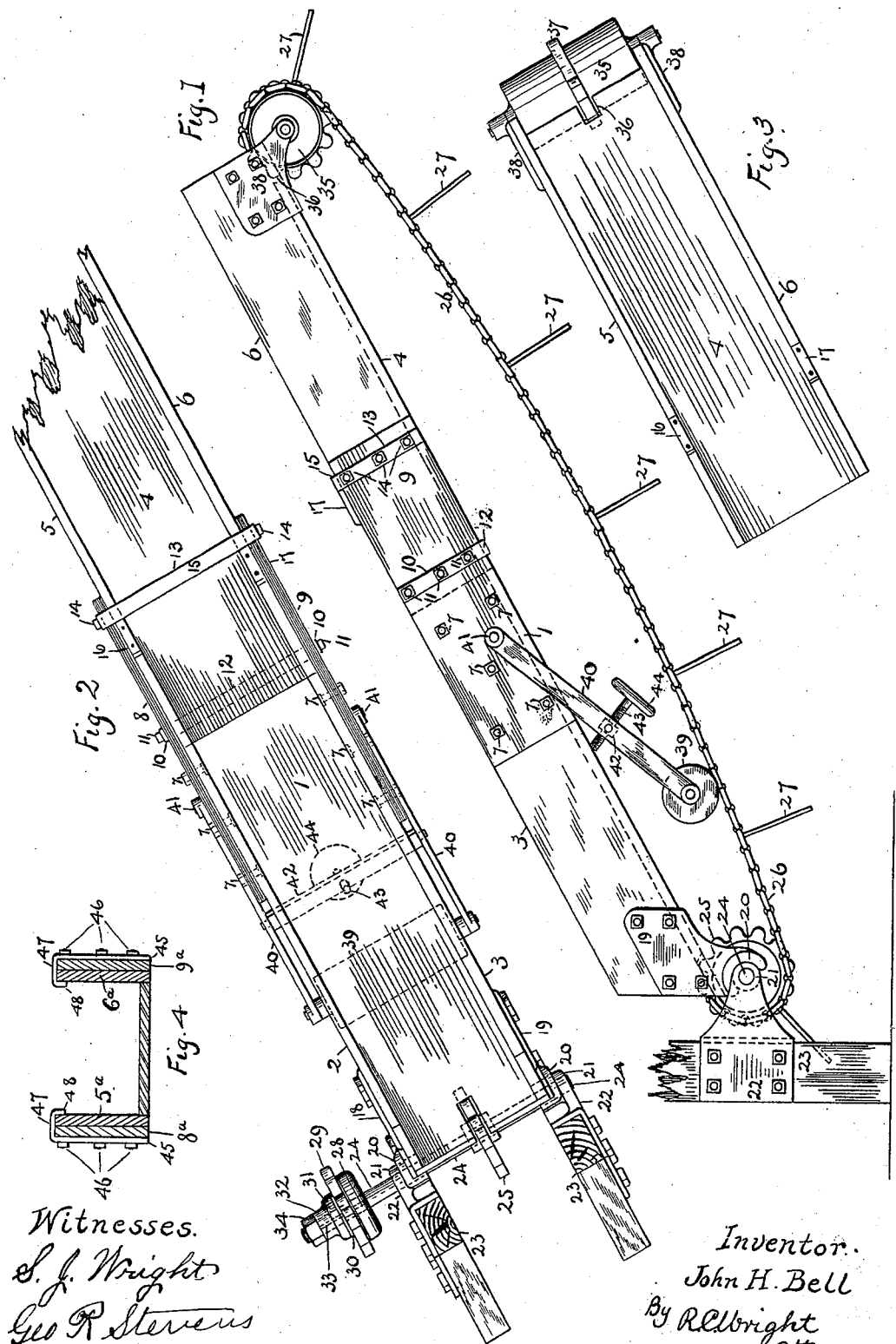
Witnesses.
S. J. Wright
Geo R. Stevens
Inventor.
John H. Bell
By R. C. Wright
Attorney
THE NORRIS PETERS CO., PHOTO-LITHO., WASHINGTON, D. C.

UNITED STATES PATENT OFFICE.

JOHN H. BELL, OF HADDONFIELD, NEW JERSEY.

CONVEYER.

SPECIFICATION forming part of Letters Patent No. 685,026, dated October 22, 1901.

Application filed March 13, 1900. Renewed May 15, 1901. Serial No. 60,365. (No model.)

*To all whom it may concern:*

Be it known that I, JOHN H. BELL, a citizen of the United States, residing at Haddonfield, county of Camden, State of New Jersey, have invented certain new and useful Improvements in Conveyers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in conveyers used for ensilage and other products, and which must be elevated and carried from the machine to the loft or place of storage after such products are cut and prepared for use by the machine employed for such purpose, and is operated from the engine which works the cutting-machine and has its lower end supported in proper position on the framework of the cutting-machine. As in many instances the conveyer must reach for a long distance above the machine, it must be made in sections to permit of its adaptation to reach and deliver at different distances, to afford ease in handling and erecting as well as convenience for storing when it has to be transported to various places for use, and the means for securing the trough-sections together, while made to provide a very stiff and straight course, must also be such as to be readily applied and without any loose or detached parts and without the employment of specially skilled labor. I have also provided means to deliver the elevated material at the desired point without any part of it being carried back and dropped outside of the storage-loft, as is done by the constructions heretofore in use. I also provide a means to automatically keep the working link belt from becoming too slack and running off of its driving-wheel; also, a friction attachment, so that when from any cause a clog occurs the flights and their load are stopped no breakage of the driving-shaft or any of its attached parts will take place, and the power may be shut off until the obstruction is overcome. I have illustrated but two sections of length of the conveyer-trough; but it will be readily understood that any desired number of intermediate sections may be introduced, as each of such sections are made with ends, as illustrated, male and female, for such purpose. I attain these objects by the mechanism shown in the accompanying drawings, in which—

Figure 1 is a side elevation. Fig. 2 is a plan of the lower section, showing also its joining with an intermediate or upper section and the friction device. Fig. 3 is a plan of the top section, showing the delivery-roller. Fig. 4 is a modification.

Similar figures of reference indicate similar parts throughout the views.

The lower section of the conveyer-trough consists of a bottom part 1, and joined thereto are perpendicular side pieces 2 3. In the upper section there is a bottom piece 4 and side pieces 5 6. Attached to the outside of sides 2 3, and preferably by bolts 7, are guide-pieces 8 9, which are long enough to project beyond bottom 1 and sides 2 3 to about the same distance they overlap sides 2 3, where they overlap sides 5 6 of the adjoining section. Close to the upper ends of bottom 1 and sides 2 3 I attach a U-shaped strap 10 to the outsides of guide-pieces 8 9, preferably by bolts 11, the center 12 of strap 10 passing below sides 5 6 and across from side to side with its upper surface flush with the under side of bottom 4. At about the same distance from the outer end of guide-pieces 8 9 as strap 10 is from the end of bottom 1 I attach another strap 13, it being an inverted U, and preferably by bolts 14, the center 15 of this strap passing across from side to side with its under side flush with the top edges of guide-pieces 8 9. In Fig. 4 will be seen a modification in which in place of the strap 13 I use a pair of straps 45, one being secured to each guide-piece 8ª 9ª in the same place and manner as 13 by bolts 46, but instead of being joined across is bent inward, as at 47, which passes above the tops of guides 8ª 9ª and sides 5ª 6ª and thence down inside of sides 5ª 6ª for a short distance, as 48. This form of fastening with a hooked-strap connection obviates the necessity of the conveyed load being limited as to height parallel or below the top of the trough sides 2 3 5 6. The lower end of the upper section of the trough or of any section interposed is without attachments except lugs 16 17, which are secured to the tops of sides 5 6 at just the right place to have their upper ends abut the lower edge of straps 13 or 45 when the sections are joined, as seen in Figs. 1 and 2.

In joining the sections it is only necessary to slightly deflect the upper end of the upper section to enable the insertion of bottom 4 over part 12 of strap 10, so that lugs 16 17 may pass under strap 13 or 45, when the upper end of the section being moved to a straight line with the lower or adjoining section they will be securely held together, as their weight and the load they carry tends to force bottom 4 onto part 12 of strap 10 and the upper edge of sides 5 6 against part 15 of strap 13 or part 47 of strap 45, while lugs 16 17 abut strap 13 or 45 and prevent the adjoining sections from separating endwise.

At the lower end of the bottom section of the trough are flanged lugs 18 19, bolted to sides 2 3 and having at their lower ends a jaw 20, which fits over and partially embraces a hub 21 of each bearing 22, bolted to framing 23 of the cutting-machine. A shaft 24 is placed in bearings 22, and on the shaft central in the trough is secured a sprocket-wheel 25, over which is placed and driven link belt 26, to which are secured flights 27. The shaft 24 extends beyond one bearing 22, and a flanged hub 28 is keyed or otherwise secured to revolve with shaft 24. A sprocket-wheel 29 abuts the flanged hub 28 and runs freely on shaft 24 and on its side opposite hub 28 is provided with a disk 30, of leather or other compressible material, which in turn abuts a plate 31, having a hub 32 and caused to revolve with shaft 24 by a feather 33 let into the shaft and the plate and its hub, but over which they move freely in the direction of the shaft's length. The shaft 24 has a screw-thread cut upon its outer end, and a nut 34 is screwed thereon.

A link belt runs on sprocket-wheel 29, connecting it with the cutting-machine, and by which it is driven. By turning nut 34 on its thread and forcing the described parts against the sprocket-wheel 29 a sufficient amount of friction can be exerted to operate the conveyer and carry its load; but whenever it is clogged or obstructed or exceeds the force exerted by the friction produced upon the sprocket-wheel 29 it will revolve without operating the conveyer or breaking any of the moving parts, and the means I have shown and employ furnish a ready method to adjust the driving power to the work to be done and avoid breakages and damage in case of any obstruction.

At the upper end of the conveyer it has generally been the practice when using link belts to place a sprocket-wheel similar to the wheel 25 at the lower end with the upper end of the trough at the center of the wheel. As the conveyers are introduced into the storage-lofts through a window or similar opening and often at as great an angle as sixty degrees, it will be readily understood that this angularity will cause an open space from the end of the trough to the periphery of the wheel over which the flights pass, the amount of open space thus caused being proportionate to the the angle, or no space if the trough is vertical, and the space increasing with each degree of angle the trough is set less than vertical or ninety degrees until when reaching its greatest amount at a horizontal line there is the greatest space. Through this space the conveyed material drops short of its destination and causes trouble in placing the conveyer and work in rehandling the droppings. To overcome these objections, I place a sprocket-wheel 37 at the upper end of the trough, which runs close to the bottom 4 and has only a small space 36 cut away to clear its teeth 37, which project from the body of the roller just enough to engage the link belt and guide it. A flange projecting outward from the roller at each side of the chain or a groove cut in the roller could be employed to guide the chain; but I deem the use of such devices equivalent to the means I have described and which I prefer to employ. The flights 27 follow the periphery of the rollers 35, attached to each side of sprocket-wheel 37, and at any and every angle insure the dropping of the conveyed material from the extreme end of the conveyer. Bearings 38 support the sprocket-roller 35. To keep the link belt tight enough to prevent its swaying sidewise, and prevent its thereby being guided off of its driving-wheel 25, I employ a guide-roller 39, journaled in links 40, secured to the trough at 41, the roller being preferably about the width of the trough and near the driving-wheel 25. A bar 42 reaches from the link 40 on one side to the corresponding link on the other side, is journaled at its ends to each link, and at the center of its length is tapped to receive a screw 43, having a hand-wheel 44, by means of which the roller can be adjusted to prevent the sway of the link belt for a conveyer in any number of sections and insure the link belt running in a line to truly guide it on to its driving-wheel.

I am aware that "an idle sprocket-pinion" has been used to run on the chain or belt for tension purposes, but in my practice I have found that the chain or link belt is very liable to run off of the sprocket and the chain and flights become entangled with the sprocket-teeth and the supports of the sprocket-wheel which lie close to it. Hence I have introduced the wide roller 39 and placed its supports 40 away from the path of the chain and also placed my roller near the driving-wheel 25 to insure the chain being surely guided thereto and to prevent any breakage regardless of the amount of side sway of the chain.

My sprocket-roller 35 37 and guide-roller 39 are equally adapted to conveyers using one or two link belts.

I claim—

1. In a conveyer, a trough therefor in sectional lengths, having at the junction of the lengths guide-pieces secured to one section, and extending beyond said section, embracing and overlapping the end of the inserted and adjoining section, means secured to the guide-strips to underlie and support the bottom of the inserted section, and near its end, means near the outer projecting ends of the guide-strips to go over the inserted section, from side to side, and prevent its raising, and means thereto abutting to secure the sections from end separation when they are secured between the means to support, and to prevent rising, substantially as set forth.

2. In a conveyer, a trough therefor in sectional lengths, having at the junction of the lengths guide-pieces secured to one section, and extending beyond said section, embracing the end of an inserted and adjoining section, means secured to the guide-pieces to underlie and support the bottom of the inserted section, means upon the guide-pieces near the overhanging ends, to go over each side of the inserted section, at its top, to lock upon and prevent its rising, and means thereto abutting to prevent the sections from parting endwise when placed in true alinement, substantially as described.

3. In a conveyer, a trough, a link belt and flights thereto secured, means to drive the link belt, means, opposite the driving means, to guide the link belt, a roller the full width of the trough, journaled in links at each side of the trough, suspended to the trough in manner to move radially from its attachment, under the trough and over the returning part of the link belt and its flights, and means to press the roller to the belt to prevent the side swaying of the belt or its entangling in the roller-supports and guide it to its driving-wheel, substantially as and in the manner set forth.

4. In a conveyer, a link belt and flights therefor, a driving-wheel for the belt, a driven roller for the belt, a trough formed in sections joined to each other by male and female ends, interlocking and secured to each other by means to secure vertical and sidewise alinement and prevent their separation when so interlocked, said means consisting of attached parts constructed to unite the adjoining sections without other manipulation, adjustment or fastenings than the entrance of the male part into the female part at a vertical angle and when so entered, interlocked and secured by simply straightening the sections in true vertical alinement, substantially as fully set forth.

In testimony whereof I affix my signature in the presence of two witnesses.

JOHN H. BELL.

Witnesses:
  W. H. ALCOCK,
  R. C. WRIGHT.